July 25, 1967 — D. A. GALLANT — 3,332,623

ATOMIZER

Filed Dec. 14, 1964 — 2 Sheets-Sheet 1

INVENTOR.
DONALD A. GALLANT
BY
Channing L. Richards &
Dalbert U. Shefte
ATTORNEYS

INVENTOR.
DONALD A. GALLANT 3,332,623
ATOMIZER
Donald A. Gallant, 2611 Danbury St.,
Charlotte, N.C. 28211
Filed Dec. 14, 1964, Ser. No. 418,126
7 Claims. (Cl. 239—105)

The present invention relates to an improved atomizer construction utilizing an arrangement of sealing, cushioning and stabilizing elements and surface cleaning means that provide a substantially increased operating efficiency and long wear life, and importantly reduce the undesirable escape of unatomized liquid to the atmosphere. Further, the present invention may be readily incorporated in existing atomizers during routine reconditioning.

Briefly described, the present invention includes a resilient sealing and cushioning element mounted in the housing of an atomizer and encircling the atomizing orifice thereof to receive the impact of a carriage slidable in the housing and to form a seat for the carriage to seal the orifice when the carriage is in an inoperative sealing position across the orifice. This sealing and cushioning element also encompasses a portion of the bearing surface of the carriage against which surface air under pressure acts to move the carriage away from the orifice to an operative position, such that only a limited surface is acted upon initially as the air pressure builds up, but once the pressure is sufficient to start opening movement of the carriage away from the sealing element the full surface is exposed to the action of the air pressure to complete opening in a snap action without a noticeable leakage of unatomized liquid.

Mounted on the sliding carriage at a spacing from a port through which air under pressure is introduced into the housing is an O-ring seal that is slidable with the carriage and extends into sealing engagement with the housing surface to confine the air for effective carriage operating and atomizing utilization. A second O-ring seal may also be mounted on the carriage in spaced relation to the first O-ring seal for cooperation therewith to stabilize the carriage in proper alignment with respect to the atomizing orifice and to provide an additional seal. These O-ring seals are of particular advantage in reconditioning of old atomizers as they can be selected to such size as to fit a housing bore that has been rebored to an oversize to remove scarifications.

When the present invention is incorporated in an existing atomizer of the type that has an air vent originally provided therein to vent air that escapes from the operating area, but which is unnecessary when the first O-ring seal of the present invention is incorporated upon reconditioning, the two O-ring seals can be mounted on opposite sides of the vent not only to prevent escape of air thereto but also to prevent air being aspirated therethrough to the water passing through the atomizer. In practice, compressed air often carries with it moisture and oil vapor from the compressor. With conventional atomizers, this water-oil mixture tends to collect around the carriage and drips from the vent hole. Further, it has been noted on occasion in practice that without a seal between the vent and the water chamber, water will collect around the carriage and drip from the vent hole. These disadvantages are eliminated with the double O-ring seals of the present invention.

Incorporated in the atomizer adjacent the atomizing orifice is surface cleaning means that prevent the undesirable deposit of foreign matter on the exterior surface of the atomizer adjacent the orifice, which deposit requires frequent cleaning in conventional atomizers. This surface cleaning means includes air holes formed through the atomizer adjacent the orifice to direct air from within the atomizer to the exterior surface. In the preferred embodiment, the orifice and air holes are provided in an air plate that is mounted on the housing by a cap that partially overlaps the plate and overlies the air holes at a spacing from the plate to form an annular passage for uniform distribution of the air, which passage opens radially inward toward the orifice to direct the air across the intermediate surface of the plate.

The sealing and cushioning element at the atomizing orifice, the O-ring seals on the carriage and the air holes for cleaning the surface adjacent the orifice provide a significant increase in the efficiency of operation, with the O-ring seals particularly preventing inefficient leakage of air and combining with the snap action opening resulting from the sealing element's relation to the bearing surface of the carriage to substantially eliminate the undesirable dripping of unatomized liquid from the atomizer, which is a common disadvantage of conventional atomizers.

The various features and advantages of the present invention are incorporated in the preferred embodiment described in detail below and illustrated in the accompanying drawings, in which.

Figure 1:
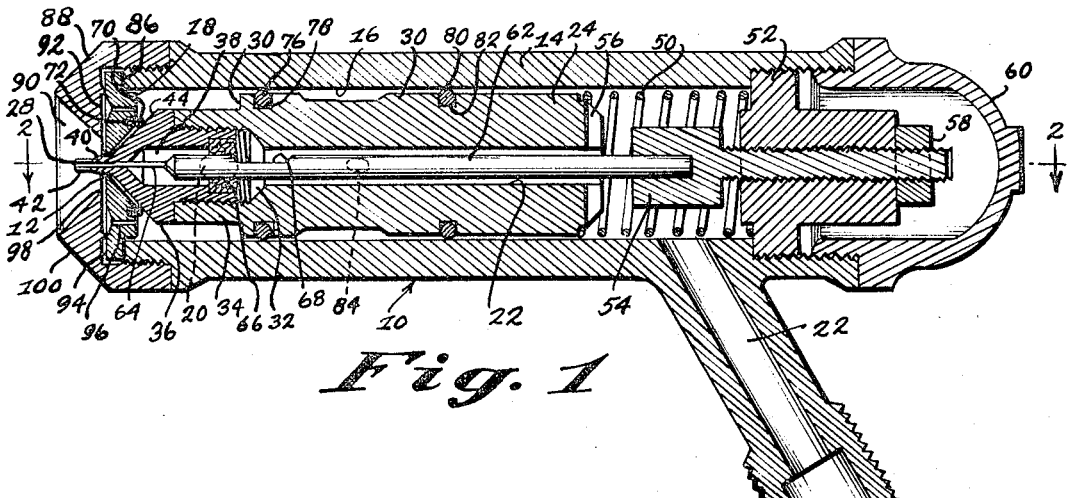
FIG. 1 is a vertical sectional view along the central axis of the preferred embodiment of the atomizer of the present invention, showing the elements in inoperative position.

In the illustrated embodiment, the atomizer 10 is of the type generally used in a humidifying system to add water vapor to the ambient air to provide a desired humidity level, as in a manufacturing plant where particular humidity conditions are necessary for carrying out a particular process or are simply desirable for more efficient operation. The water vapor is added to the air in the form of an atomized mist sprayed from the atomizing orifice 12 of the atomizer 10 by air under pressure flowing through the orifice 12 and drawing water therethrough, atomizing the water in so doing.

Basically, the atomizer 10 of the illustrated embodiment consists of an elongated housing 14 that has a cylindrical bore 16 at one end of which the housing is provided with an air plate 18 in which the atomizing orifice 12 is centrally formed. Air is introduced into the bore 16 for atomizing action through the orifice through an air intake port 20 to which is connected a conduit (not shown) leading from an air pressure supply. Water is fed to the atomizer through a water intake port 22 from a supply (not shown) for discharge at the atomizing orifice 12. Operation of the atomizer is controlled by a cylindrical carriage 24 slidable in the housing bore 16 between an inoperative orifice closing position (FIGS. 1 and 3) and a retracted operative position (FIG. 2) to which it is moved and retained by the air pressure within the housing 14.

The air intake port 20 is formed adjacent the orifice end of the housing 14 for operating action of the air against the carriage 24 to slide it to operative position away from the orifice 12, and the water intake port 22 is formed inwardly of the housing beyond the rear of the operative position of the carriage 24, which is formed with an axial passage 26 through which the water passes to a water discharge opening 28 at the forward end of the carriage 24 in alignment with the atomizing orifice 12 for drawing of the water therefrom in an atomizing action by the flow of air through the orifice.

The carriage 24 is compositely formed with a cylindrical body component 30 having an elongated cylindrical periphery slidably fitting in the housing bore 16 and having the water passage 26 extending axially therethrough to an enlarged internally threaded chamber 32 in a reduced diameter forward portion 34 in which a tip component 36 is threadably secured. This tip component 36 provides a continuation 38 of the water passage 26, at the forward end of which is formed the water discharge opening 28 in a nozzle-like extension 40 that is of a diameter that fits substantially fully the atomizing orifice 12 when the carriage 24 is in its forward inoperative position (FIGS. 1 and 3) and has a reduced diameter at its outer end 42 to provide an annular air flow space between the nozzle extension 40 and the orifice 12 when the outer end 42 is disposed in the orifice upon retraction of the carriage 24 to retracted position (FIG. 2).

Figure 2:
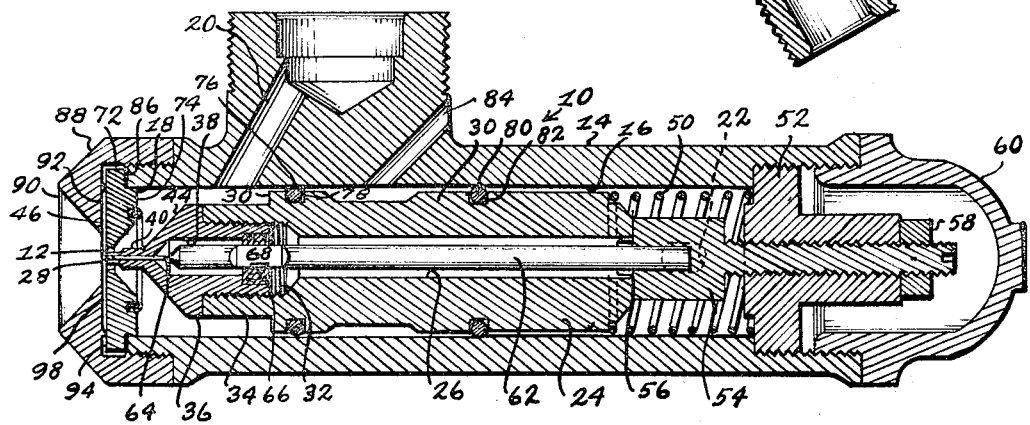
FIG. 2 is a horizontal sectional view of the atomizer of FIG. 1, taken along line 2—2 of FIG. 1, and showing the elements in operative position.
Figure 3:
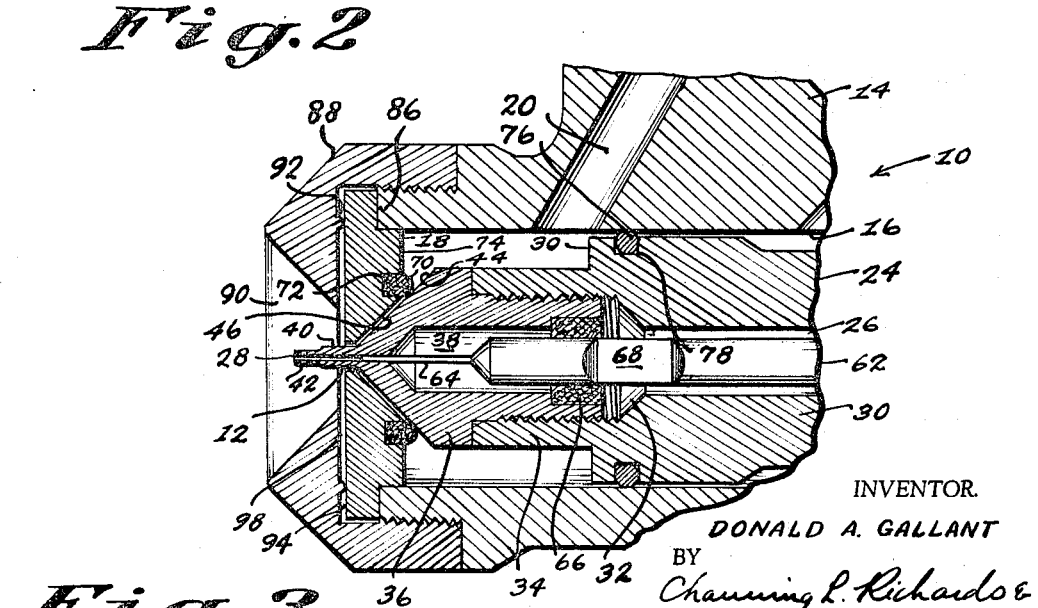
FIG. 3 is a fragmentary enlargement of the head end portion of FIG. 2, showing the elements in inoperative position.
Figures 4, 5, 6:
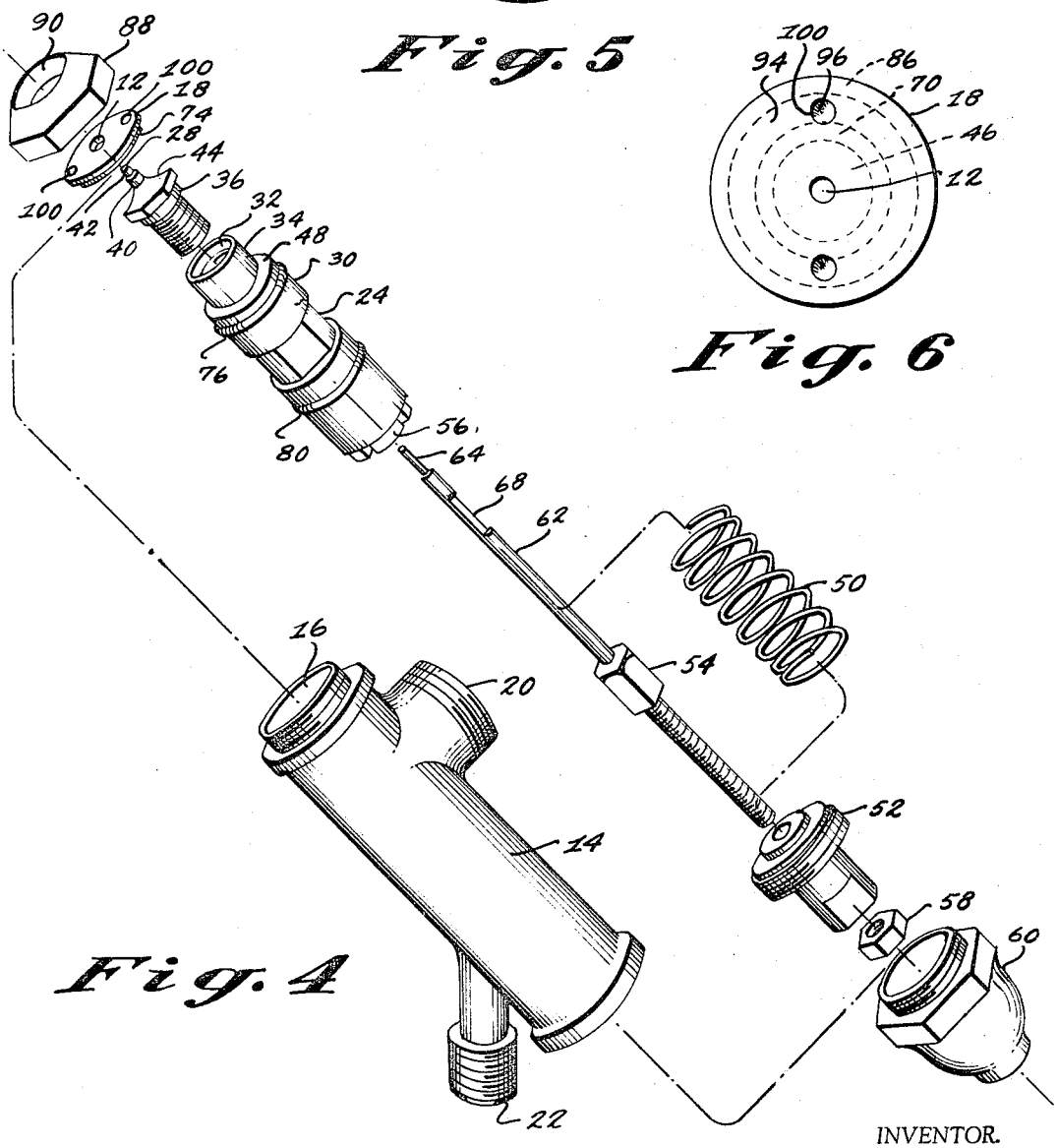
FIG. 4 is an exploded perspective view of the atomizer of FIG. 1.
FIG. 5 is an enlarged elevational view of the inner face of the air plate of the atomizer of FIG. 1.
FIG. 6 is an enlarged elevational view of the outer face of the air plate of FIG. 5.

The tip component 36 of the carriage 24 has a tapered bearing surface 44 extending rearwardly from the nozzle extension 40, and the atomizing orifice 12 is formed with a corresponding taper 46 to accommodate positioning of the tapered bearing surface 44 in orifice closing disposition when the carriage is in its forward inoperative position (FIGS. 1 and 3). This bearing surface 44 of the carriage tip component 36, as well as the annular shoulder 48 resulting from the reduced diameter formation of the forward portion 34 of the carriage body component 30, provides a bearing area against which the air that is introduced into the housing bore 16 through the air intake port 20, which is forward of the shoulder 48, acts to slide the carriage rearwardly from inoperative to operative position and to retain the carriage in operative position during operation of the atomizer.

In sliding the carriage 24 to retracted operative position and retaining it in this position, the air pressure acts against a compression spring 50 disposed in the housing bore 16 rearwardly of the carriage 24 and seated between the carriage and a plug 52 threadably secured in the rear of the housing 14. Retracted movement of the carriage 24 is stopped at a proper operative position by a stop member 54 centrally threaded in the plug 52 and extending forwardly thereof for stopping engagement with the carriage 24, which has lateral channels 56 formed at its inner end to permit water to pass to the axial passage 26 without obstruction by the stop member 54. The stop member 54 is adjustable by means of the threaded mounting in the plug 52 and it is secured in a selected position by the lock nut 58 on the rearwardly extending end beyond the plug 52. A cover member 60 is threadably mounted on the end of the housing 14 rearwardly of the stop member 54, plug 52 and lock nut 55 to protect these elements and to prevent inadvertent maladjustment.

Secured in the stop member 54 and extending forward axially therefrom is a cleaning rod 62 of a lesser diameter than the carriage water passage 26 and extending therethrough to a tip end 64 of a lesser diameter than, and disposed in, the water discharge opening 28 in the nozzle extension 40 of the carriage tip component 36. As the cleaning rod 60 is fixed to the stop member 54 it does not slide with the carriage 24 and therefore movement of the carriage 24 results in a relative movement of the cleaning rod tip end 62 in the water discharge opening 28.

The cleaning rod 62 is positioned in proper axial alignment with the water passage 26 and the water discharge opening 28 of the carriage 24 by an annular bearing element 66 seated in the carriage tip component 36 in surface contacting relation to the cleaning rod 62. Preferably this bearing element 66 is formed of a material to which foreign particles are not likely to adhere so that it can fit closely on the cleaning rod to seal the water passage 26 when the carriage 24 is in inoperative position (FIGS. 1 and 3). To permit flow of water past the bearing element 66 when the carriage is in operative position (FIG. 2), the cleaning rod 62 is notched, as at 68, at the position that is in alignment with the bearing element when the carriage 24 is in retracted operative position. The notch 68 extends axially sufficiently to permit a satisfactory flow of water past the bearing element for atomizing from the discharge opening 28.

The slidable carriage 24 slides forwardly under the influence of the coil spring 50 to its orifice closing inoperative position (FIGS. 1 and 3) whenever the air pressure is turned off. Normally this would result in a considerable impact of the carriage against the air plate 18, but to reduce substantially the shock of impact and thereby reduce the wear and strain on the elements, the present invention includes a resilient cushioning element 70 of elastomeric material seated in an annular recess 72 in the inner surface 74 of the air plate 18 concentric with the atomizing orifice 12 and outwardly of the orifice taper 26. This annular element 70 protrudes beyond the air plate inner surface 74 for engagement with the tapered bearing surface 44 of the carriage tip component 36, not only to absorb the shock of impact, but also to form with the bearing surface 44 a tight seal of the atomizing orifice 12 when the carriage 24 is in inoperative position, thereby preventing inefficient air leakage.

This resilient sealing and cushioning element 70 is spaced from the opening of the atomizing orifice 12 by the extent of the orifice taper 26 and thus spaces the shock of impact advantageously from the thin periphery of the orifice, which is highly susceptible to damage by carriage impact. Also, the spacing of the sealing and cushioning element from the orifice results in an important advantage in effecting a snap action opening of the orifice and substantially immediate full atomization that substantially eliminates the undesirable initial water drip that often occurs before full atomizing action is obtained with the slow-opening conventional atomizers. This advantageous snap action is obtained by the sealing and cushioning element 70 encompassing a significant portion of the carriage bearing surface 44 so that upon initial introduction of air into the housing only the carriage shoulder 48 and a portion of the bearing surface 44 are exposed to the action of the air, and until the air pressure has built up considerably the exposed surfaces do not provide sufficient area for moving of the carriage 24 against the bias of the spring 50. However, once the air pressure is sufficient to overcome the spring pressure to initiate movement of the carriage away from the air plate, the bearing surface 44 is separated from the sealing and cushioning element 70 exposing the full surface area of the bearing surface to the action of the air, thereby increasing the effective force of the air to complete opening of the atomizer quickly in a snap action for immediate full atomization without preliminary dripping.

The annular configuration of the sealing and cushioning element 70 and the taper of the bearing surface 44 that seats thereagainst combine to assure a full seal completely around the orifice 12, with any slight misalignment of the elements being corrected inherently upon engagement of the elements.

The complete sealing and the snap action provided by the annular sealing and cushioning element 70 prevent leakage of air prior to full atomizing utilization of the air, thereby increasing the operational effectiveness of the available air, which is further increased by sealing of the housing bore 16 inwardly of the air intake port 20 so that all of the air is utilized for atomizing. This latter sealing is accomplished by an O-ring seal 76 of elastomeric material mounted in an annular recess 78 on the periphery of the carriage body component 30 adjacent the air intake port 20 and extending into annular sealing engagement with the surface of the housing bore 16 to confine the air forwardly thereof for effective operating and atomizing utilization thereof, and importantly to prevent entry of air into the water passage 26 at the inner end of the carriage 24, which would inefficiently disrupt the pattern of atomization, causing water to drip and requiring greater air flow to accomplish proper atomization. A substantial flow of air into the rear of the housing could also disable the atomizer and the entire system as well by forcing the water back out of the water intake port 22 into the supply reservoir (not shown).

In the embodiment illustrated, a second O-ring seal 80 is similarly mounted on the carriage 24 in a recess 82 at a rearward spacing from the first-mentioned O-ring seal 76 for sealing engagement with the housing bore 16 and cooperating with the first-mentioned O-ring seal 76 to stabilize the carriage in proper axial alignment with the atomizing orifice 12.

The pair of O-ring seals 76 and 80 also serve to extend the useful life of worn atomizers by permitting reconditioning of scarred bores by reboring to an oversize diameter to remove the scars, following which O-ring seals 76 and 80 of proper thickness can be selected to fit the original size carriage 24 in sealing and stabilizing disposition in the oversize bore 16. Also, when reconditioning atomizers of the type illustrated, having an air vent 84 inwardly of the air intake port 20 conventionally provided to vent air escaping from in front of the carriage 24 so that the escaped air will not interfere with the water flow at the rear of the carriage, which vent is unnecessary with the present invention, the second O-ring seal 80 is effectively disposed rearwardly of the air vent 84 and the first O-ring seal 76 is disposed forwardly thereof to block-off the vent completely, not only from the air in the front of the atomizer, but also from the water in the rear.

During operation of the atomizer 10, with the carriage in retracted operative position (FIG. 2), the atomizing orifice 12 in the air plate 18 is open to permit atomizing discharge of air and water in a conical spray. This air plate 18 is generally disc shaped with an annular outer shoulder 86 that seats against the forward end of the housing 14, which is externally threaded to secure thereon a peripheral air plate retaining cap 88 that has an inner annular portion 90 overlapping the air plate 18 outwardly of the orifice 12 and having a plate contacting annular ridge 92 facing the outer face 94 of the air plate to engage it and hold it in place. The annular overlapping portion 90 of the retaining cap 88 is spaced radially from the atomizing orifice, leaving a portion of the air plate outer surface 94 exposed, and extends at an outward taper away therefrom so as not to interfere with the conical shaping of the atomized mist that issues from the orifice 12.

During operation, there is a tendency for atmospheric air to be drawn to the periphery of the orifice 12, causing foreign matter, such as lint in a textile plant, to be deposited on the outer surface 94 of the air plate 18, which deposits interfere with the spray formation of the atomized mist, reducing the effectiveness of the atomizer and requiring frequent disassembly for cleaning of the deposit from the air plate.

To eliminate this problem, the present invention includes means for preventing the deposit of foreign matter on the air plate outer surface 94, which includes a pair of diametrically opposed air holes 96 extending through the air plate 18 at a lateral spacing from the atomizing orifice 12, but inwardly of the cap ridge 92, and of substantially smaller cross-section than the orifice so as not to reduce significantly the atomizing effectiveness of the air flow through the orifice. These air holes 96 open on the outer surface 94 of the air plate with the annular portion 90 of the peripheral cap 88 overlying the air holes and with the cap ridge 92 spacing the underside of the annular cap portion 90 from the air plate 18 to provide an annular passage opening radially inward toward the atomizing orifice such that air passing through the air holes 96 will be uniformly distributed around the passage 98 and directed thereby across the outer air plate surface 94 in a cleaning action toward the atomizing orifice 12. The uniform distribution of the cleanng air is further enhanced by forming the air holes with substantial tapered enlargements 100.

In operation, the atomizer 10 is mounted for directing a spray of atomized water vapor in a convenient location, normally in a system that includes a plurality of atomizers. The air intake port 20 is then connected to a source of air pressure having a control valve (not shown) and the water intake port 22 is connected to a water supply from which water is drawn simply by the aspirating action of the atomizer or which may be under pressure, in which case the water discharge is controlled by the cut-off action of the cleaning rod 62 in the annular bearing 66 as described hereinabove. Actuation of the atomizer is accomplished as desired by the conventional air valve (not shown) that allows pressurized air to enter the housing bore 16 to slide the carriage 24 to retracted operative position in which the atomizing orifice 12 is open to allow air to flow therethrough and the cleaning rod notch 68 is aligned with the annular bearing 66 to allow water to flow through the carriage passage 26 to be atomized to the atmosphere. At the end of the operating period the air valve is manipulated to cut off the air supply so that the carriage 24 slides forward under the force of the spring 50 to its inoperative position in which the atomizing orifice 12 is closed by the carriage 24 and the water passage 26 is closed by disposition of the cleaning rod 62 in the annular bearing 66.

In the use of the atomizer of the present invention, the sealing features result in a substantial increase in the suction efficiency due to the elimination of the escape of operating air to the water passage or through the vent of a conventional housing, rather than through the atomizer, and either more air is available for atomization or less air is required to produce the same amount of atomization as in prior atomizers of this type.

Although the present invention has been illustrated and described herein with relation to a particular atomizer structure, it should be noted that the present invention is applicable as well to various other types of atomizers and the features can be incorporated in elements of varying forms all within the intended scope of the present invention, which is not intended to be limited by the embodiment illustrated and described or limited otherwise except as defined in the appended claims.

I claim:

1. An atomizer comprising a housing having an atomizing orifice, a carriage slidably mounted in said housing and having a liquid discharge opening aligned with said atomizing orifice, means yieldably retaining said carriage in inoperative closing disposition across said atomizing orifice, means for supplying a liquid for discharge from said discharge opening, means for introducing air under pressure into said housing for sliding said carriage against said yieldably retaining means to an operative position in which said orifice is open for passage of air therethrough to atomize liquid from said discharge opening into the atmosphere, and a resilient sealing and cushioning element mounted in said housing encircling said atomizing orifice and facing said carriage for cushioning the impact of said carriage against said housing upon movement of said carriage to inoperative position and for seating of said carriage in orifice sealing disposition.

2. An atomizer according to claim 1 and characterized further in that said resilient sealing and cushioning element is spaced from said atomizing orifice to receive the impact of said carriage away from said atomizing orifice.

3. An atomizer comprising a housing having an atomizing orifice, a carriage slidably mounted in said housing and having a liquid discharge opening aligned with said atomizing orifice, means for supplying a liquid for discharge from said discharge opening, a resilient sealing element mounted in said housing encircling said atomizing orifice and facing said carriage, said carriage having a bearing surface facing said sealing element, means yieldably retaining said carriage in inoperative disposition with said bearing surface seated against said sealing element in orifice sealing disposition, said carriage extending laterally beyond said sealing element, and means for introducing air under pressure into said housing for acting initially against said lateral extent of the carriage to initiate movement of said carriage away from said sealing element after which said air acts additionally against the full bearing surface to increase the opening action of the air against said carriage to snap said carriage to an operative position in which said orifice is open for passage of air therethrough to atomize liquid from said carriage discharge opening into the atmosphere.

4. An atomizer according to claim 3 and characterized further in that the carriage bearing surface encompassed by said resilient element when said carriage is in inoperative position is substantial and provides a substantial additional surface against which said air acts to snap said carriage to operative position following initial movement of said carriage away from said sealing element.

5. An atomizer according to claim 3 and characterized further in that said carriage bearing surface tapers toward said atomizing orifice and said housing is recessed between said resilient element and said atomizing orifice to accommodate seating of said tapered bearing surface against said resilient element in an effective sealing disposition.

6. An atomizer comprising a housing having a cylindrical bore and an atomizing orifice at the outer end of said bore, a cylindrical carriage slidably mounted in said housing bore and having a liquid discharge opening aligned with said atomizing orifice, means for supplying a liquid for discharge from said discharge opening, means yieldably retaining said carriage in inoperative closing disposition across said atomizing orifice, said housing having an air intake port opening into said bore, means for introducing air under presure through said port into said housing bore for sliding said carriage against said yieldably retaining means to an operative position in which said orifice is open for passage of air therethrough to atomize liquid from said discharge opening into the atmosphere, an O-ring seal of elastomeric material mounted on said carriage for sliding movement therewith in sealing engagement with the surface of said housing bore inwardly therein beyond said air intake port to confine said air outwardly thereof for effective operating and atomizing utilization of said air, and a resilient sealing and cushioning element mounted at the outer end of said bore encircling said atomizing orifice and facing said carriage for cushioning the impact of said carriage against said housing upon movement of said carriage to inoperative position and for seating of said carriage in orifice sealing disposition.

7. An atomizer comprising a housing having an atomizing orifice, a carriage slidably mounted in said housing and having a liquid discharge opening aligned with said atomizing orifice, means yieldably retaining said carriage in inoperative closing disposition across said atomizing orifice, means for supplying a liquid for discharge from said discharge opening, means for introducing air under pressure into said housing for sliding said carriage against said yieldably retaining means to an operative position in which said orifice is open for passage of air therethrough to atomize liquid from said discharge opening into the atmosphere, a resilient sealing element mounted in said housing encircling said atomizing orifice and facing said carriage for seating of said carriage in orifice sealing disposition in its inoperative position, and air holes formed in said housing laterally of said atomizing orifice and of substantially smaller cross-section than said atomizing orifice for directing air from within said housing to the exterior of said housing adjacent said atomizing orifice to prevent deposit of foreign matter on the housing exterior adjacent said atomizing orifice.

References Cited
UNITED STATES PATENTS

| | | | |
|---|---|---|---|
| 2,173,072 | 9/1939 | Loepsinger | 239—118 |
| 2,179,184 | 11/1939 | Hodge | 239—118 |
| 2,436,815 | 3/1948 | Leim | 239—412 |
| 2,594,945 | 4/1952 | Loepsinger | 239—412 |
| 2,774,629 | 12/1956 | Noon et al. | 239—105 |
| 2,896,854 | 7/1959 | Noble et al. | 239—105 |

EVERETT W. KIRBY, *Primary Examiner.*